United States Patent
Jiang et al.

(10) Patent No.: US 11,814,554 B2
(45) Date of Patent: Nov. 14, 2023

(54) SILICONE PRESSURE SENSITIVE ADHESIVE COMPOSITION AND METHODS FOR THE PREPARATION AND USE THEREOF

(71) Applicant: Dow Silicones Corporation, Midland, MI (US)

(72) Inventors: Jingui Jiang, Shanghai (CN); Qing Cao, Shanghai (CN); Zhihua Liu, Shanghai (CN); Yan Zhou, Shanghai (CN); Ruihua Lu, Shanghai (CN); Chengrong Zhu, Shanghai (CN); Jiayin Zhu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/635,496

(22) PCT Filed: Oct. 31, 2019

(86) PCT No.: PCT/CN2019/114575
§ 371 (c)(1),
(2) Date: Feb. 15, 2022

(87) PCT Pub. No.: WO2021/081863
PCT Pub. Date: May 6, 2021

(65) Prior Publication Data
US 2022/0340785 A1    Oct. 27, 2022

(51) Int. Cl.
*C09J 183/04* (2006.01)
*C08K 5/5419* (2006.01)
*C08K 5/5425* (2006.01)
*C09J 7/38* (2018.01)
*C08G 77/12* (2006.01)
*C08G 77/20* (2006.01)

(52) U.S. Cl.
CPC ........... *C09J 183/04* (2013.01); *C08K 5/5419* (2013.01); *C08K 5/5425* (2013.01); *C09J 7/38* (2018.01); *C08G 77/12* (2013.01); *C08G 77/20* (2013.01)

(58) Field of Classification Search
CPC ........................................................ C09J 183/04
See application file for complete search history.

(56) References Cited

U.S. PATENT DOCUMENTS

| | | | |
|---|---|---|---|
| 6,121,368 A | * | 9/2000 | Heying ............... C08L 83/00 524/506 |
| 8,372,936 B2 | | 2/2013 | Mizuno et al. |
| 2019/0203077 A1 | * | 7/2019 | Park ........................ C09J 7/00 |
| 2020/0224069 A1 | | 7/2020 | Itoh et al. |
| 2021/0309899 A1 | * | 10/2021 | Jiang ..................... C08G 77/12 |

FOREIGN PATENT DOCUMENTS

| | | |
|---|---|---|
| CN | 1910249 A | 2/2007 |
| CN | 101861359 A | 10/2010 |
| CN | 102717549 B | 4/2016 |
| CN | 105882096 A | 8/2016 |
| CN | 108192520 A | 6/2018 |
| CN | 108329861 A | 7/2018 |
| CN | 109880584 A | 6/2019 |
| EP | 0945480 A1 | 9/1999 |
| JP | 06315820 B2 | 4/2018 |
| WO | 2016006252 A1 | 1/2016 |
| WO | 2016139955 A1 | 9/2016 |
| WO | 2019009175 A1 | 1/2019 |
| WO | WO 2020/248181 * | 12/2020 |
| WO | 2021000279 | 1/2021 |

OTHER PUBLICATIONS

Supplementary European Search Report from corresponding European Application No. 19950870 dated Jul. 3, 2023.

* cited by examiner

*Primary Examiner* — Marc S Zimmer
(74) *Attorney, Agent, or Firm* — Catherine U. Brown

(57) ABSTRACT

A silicone pressure sensitive adhesive composition is curable to form a silicone pressure sensitive adhesive. The silicone pressure sensitive adhesive composition can be coated on a substrate and cured to form a protective film. The protective film can be adhered to an anti-fingerprint coating on display glass, such as cover glass for a smartphone.

15 Claims, 1 Drawing Sheet

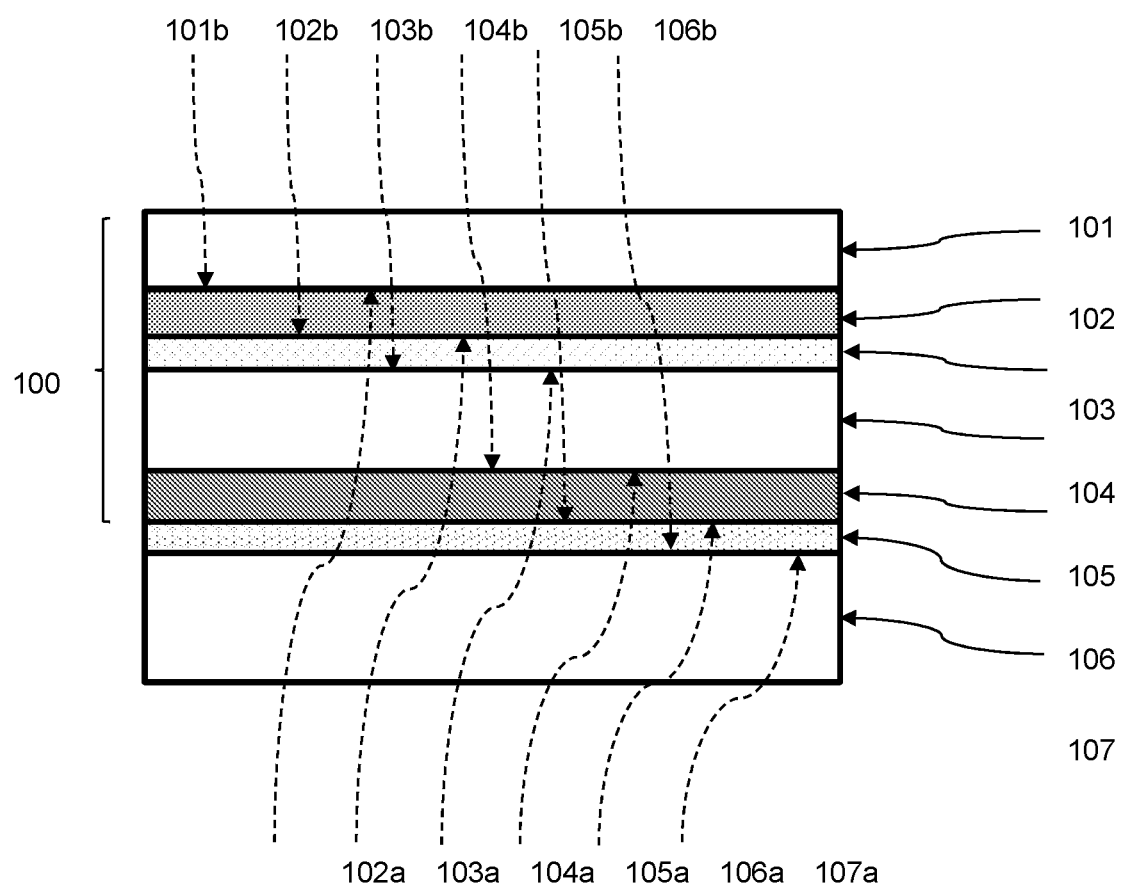

SILICONE PRESSURE SENSITIVE ADHESIVE COMPOSITION AND METHODS FOR THE PREPARATION AND USE THEREOF

CROSS REFERENCE TO RELATED APPLICATIONS

This application is a U.S. national stage filing under 35 U.S.C. § 371 of PCT Application No. PCT/CN2019/114575 filed on 31 Oct. 2019, currently pending. PCT Application No. PCT/CN2019/114575 is hereby incorporated by reference.

TECHNICAL FIELD

A silicone pressure sensitive adhesive composition can be cured on a substrate to form a protective film. The protective film is useful in electronics applications for protection of display glass having an anti-fingerprint coating on its surface (AF glass).

BACKGROUND

Display devices let users access information easily, however, they suffer from the drawback of accumulating fingerprints and other materials that can damage the display or make the display difficult to see. The use of AF glass has been proposed to address these issues.

Conventional silicone pressure sensitive adhesives may lack sufficient adhesion on AF glass. If an adhesion promoting additive is included in the silicone pressure sensitive adhesive composition, the resulting silicone pressure sensitive adhesive may then have adhesion that is too high on certain substrates to allow effective processing to fabricate the display device.

SUMMARY

A silicone pressure sensitive adhesive (Si-PSA) composition and method for its preparation are disclosed. The Si-PSA composition is curable to form a Si-PSA suitable for use in protective films for display devices. A protective film comprising the Si-PSA on a surface of a substrate may be used on AF glass.

BRIEF DESCRIPTION OF THE DRAWINGS

FIG. 1 shows a partial cross section of a protective film 100.

REFERENCE NUMERALS

| 100  | protective film |
| 101  | polymeric substrate |
| 101b | surface of polymeric substrate 101 |
| 102  | second Si-PSA |
| 102a | surface of second Si-PSA 102 |
| 102b | opposing surface of Si-PSA 102 |
| 103  | anti-fingerprint hard coating |
| 103a | surface of anti-fingerprint hard coating 103 |
| 103b | opposing surface of anti-fingerprint hard coating 103 |
| 104  | substrate |
| 104a | surface of substrate 104 |
| 104b | opposing surface of substrate 104 |
| 105  | Si-PSA |
| 105a | surface of Si-PSA 105 |
| 105b | opposing surface of Si-PSA 105 |
| 106  | anti-fingerprint coating |
| 106a | surface of anti-fingerprint coating 106 |
| 106b | opposing surface of anti-fingerprint coating 106 |
| 107  | display cover glass |
| 107a | surface of display cover glass 107 |

DETAILED DESCRIPTION

The Si-PSA composition comprises: (A) an aliphatically unsaturated polydiorganosiloxane component, (B) a polyorganosilicate resin component, (C) a hydrosilylation reaction catalyst, (D) a polyorganohydrogensiloxane, and (E) an anchorage additive. The Si-PSA composition may optionally further comprise an additional starting material selected from the group consisting of (F) a hydrosilylation reaction inhibitor, (G) a solvent, and a combination of both (F) and (G). The Si-PSA composition may be free of any starting material that may detrimentally affect adhesion to desired substrates. For example, the Si-PSA composition may be free of aryl-functional siloxanes, fluorinated siloxanes, or both.

Starting Material (A) Aliphatically Unsaturated Polydiorganosiloxane Component

The Si-PSA composition comprises (A) an aliphatically unsaturated polydiorganosiloxane component comprising: (A-1) a polydiorganosiloxane gum terminated with an aliphatically unsaturated group and (A-2) a polydiorganosiloxane polymer having an aliphatically unsaturated group.

Starting material (A-1), the polydiorganosiloxane gum, has Mn 500,000 g/mol. The polydiorganosiloxane gum has unit formula: $(R^M{}_2 R^U SiO_{1/2})_2 (R^M{}_2 SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the polydiorganosiloxane gum a number average molecular weight ≥500,000 g/mol, alternatively 500,000 g/mol to 1,000,000 g/mol, and alternatively 600,000 g/mol to 800,000 g/mol.

In unit formula (A-1), each $R^M$ is an independently selected monovalent hydrocarbon group of 1 to 30 carbon atoms that is free of aliphatic unsaturation. Alternatively, each $R^M$ may have 1 to 12 carbon atoms, and alternatively 1 to 6 carbon atoms. Suitable monovalent hydrocarbon groups for $R^M$ are exemplified by alkyl groups and aromatic groups such as aryl groups and aralkyl groups. "Alkyl" means a cyclic, branched, or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. "Aryl" means a cyclic, fully unsaturated, hydrocarbon group. Aryl is exemplified by, but not limited to, cyclopentadienyl, phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. "Aralkyl" means an alkyl group having a pendant and/or terminal aryl group or an aryl group having a pendant alkyl group. Exemplary aralkyl groups include tolyl, xylyl, benzyl, phenylethyl, phenyl propyl, and phenyl butyl. Alternatively, each $R^M$ may be independently selected from the group consisting of alkyl and aryl. Alternatively, each $R^M$ may be independently selected from methyl and phenyl. Alternatively, each $R^M$ may be alkyl. Alternatively, each $R^M$ may be methyl.

In unit formula (A-1), each $R^U$ is an independently selected monovalent aliphatically unsaturated hydrocarbon group of 2 to 30 carbon atoms. Alternatively, each $R^U$ may have 2 to 12 carbon atoms, and alternatively 2 to 6 carbon atoms. Suitable monovalent aliphatically unsaturated hydrocarbon groups include alkenyl groups and alkynyl groups. "Alkenyl" means a branched or unbranched, monovalent hydrocarbon group having one or more carbon-carbon double bonds. Suitable alkenyl groups are exemplified by vinyl; allyl; propenyl (e.g., isopropenyl, and/or n-propenyl); and butenyl, pentenyl, hexenyl, and heptenyl, (including branched and linear isomers of 4 to 7 carbon atoms); and cyclohexenyl. "Alkynyl" means a branched or unbranched, monovalent hydrocarbon group having one or more carbon-carbon triple bonds. Suitable alkynyl groups are exemplified by ethynyl, propynyl, and butynyl (including branched and linear isomers of 2 to 4 carbon atoms). Alternatively, each $R^U$ may be alkenyl, such as vinyl, allyl, or hexenyl.

Polydiorganosiloxane gums are known in the art and may be prepared by methods such as hydrolysis and condensation of the corresponding organohalosilanes or equilibration of cyclic polydiorganosiloxanes. Examples of suitable polydiorganosiloxane gums for use in the Si-PSA composition are exemplified by:
  i) dimethylvinylsiloxy-terminated polydimethylsiloxane,
  ii) dimethylvinylsiloxy-terminated poly(dimethylsiloxane/methylphenyl)siloxane,
  iii) dimethylvinylsiloxy-terminated poly(dimethylsiloxane/diphenyl)siloxane,
  iv) phenyl,methyl,vinyl-siloxy-terminated polydimethylsiloxane,
  v) dimethylhexenylsiloxy-terminated polydimethylsiloxane,
  vi) dimethylhexenyl-siloxy terminated poly(dimethylsiloxane/methylphenyl)siloxane,
  vii) dimethylvinylsiloxy-terminated poly(dimethylsiloxane/diphenyl)siloxane,
  viii) a combination of two or more of i) to vii). Alternatively, the polydiorganosiloxane gum may be selected from the group consisting of i) dimethylvinylsiloxy-terminated polydimethylsiloxane,
  v) dimethylhexenylsiloxy-terminated polydimethylsiloxane, and a combination i) and v).

Starting material (A-1) is present in the Si-PSA composition in an amount of 15 weight % to 30 weight %, alternatively 18 weight % to 21 weight %, based on combined weights of starting materials (A) to (F).

In addition to starting material (A-1), starting material (A) the polydiorganosiloxane component further comprises (A-2) a polydiorganosiloxane polymer of unit formula: $(R^M{}_2R^USiO_{1/2})_x(R^M{}_3SiO_{1/2})_y(R^MR^USiO_{2/2})_z(R^M{}_2SiO_{2/2})_w$, where $R^M$ and $R^U$ are as described above; x≥0, y≥0, (x+y)=2, z>0, and w≥0, a quantity (x+z)>0, and a quantity (x+y+z+w) is sufficient to give the polydiorganosiloxane polymer a number average molecular weight of 10,000 g/mol to 300,000 g/mol, alternatively 20,000 g/mol to 200,000 g/mol, alternatively 30,000 g/mol to 100,000 g/mol, alternatively 40,000 g/mol to 80,000 g/mol, alternatively 50,000 g/mol to 75,000 g/mol, alternatively 50,000 g/mol to 75,000 g/mol, and alternatively 59,000 g/mol to 67,000 g/mol.

Aliphatically unsaturated polydiorganosiloxane polymers suitable for use as starting material (A-2) are known in the art and may be prepared by methods such as hydrolysis and condensation of the corresponding organohalosilanes or equilibration of cyclic polydiorganosiloxanes. Examples of suitable polydiorganosiloxane polymers for use as starting material (A-2) in the Si-PSA composition are exemplified by:
  i) dimethylvinylsiloxy-terminated polydimethylsiloxane,
  ii) dimethylvinylsiloxy-terminated poly(dimethylsiloxane/methylvinylsiloxane),
  iii) dimethylvinylsiloxy-terminated polymethylvinylsiloxane,
  iv) trimethylsiloxy-terminated poly(dimethylsiloxane/methylvinylsiloxane),
  v) trimethylsiloxy-terminated polymethylvinylsiloxane,
  vi) dimethylvinylsiloxy-terminated poly(dimethylsiloxane/methylvinylsiloxane),
  vii) dimethylvinylsiloxy-terminated poly(dimethylsiloxane/methylphenylsiloxane),
  viii) dimethylvinylsiloxy-terminated poly(dimethylsiloxane/diphenylsiloxane),
  ix) phenyl,methyl,vinyl-siloxy-terminated polydimethylsiloxane,
  x) dimethylhexenylsiloxy-terminated polydimethylsiloxane,
  xi) dimethylhexenylsiloxy-terminated poly(dimethylsiloxane/methylhexenylsiloxane),
  xii) dimethylhexenylsiloxy-terminated polymethylhexenylsiloxane,
  xiii) trimethylsiloxy-terminated poly(dimethylsiloxane/methylhexenylsiloxane),
  xiv) trimethylsiloxy-terminated polymethylhexenylsiloxane
  xv) dimethylhexenyl-siloxy terminated poly(dimethylsiloxane/methylhexenylsiloxane),
  xvi) dimethylvinylsiloxy-terminated poly(dimethylsiloxane/methylhexenylsiloxane)
  xvii) a combination of two or more of i) to xvi). Alternatively, starting material (A-2) may be selected from the group consisting of i) dimethylvinylsiloxy-terminated polydimethylsiloxane, ii) dimethylvinylsiloxy-terminated poly(dimethylsiloxane/methylvinylsiloxane), and a combination of both i) and ii).

Starting material (A-2) is present in the Si-PSA composition in an amount of 5 weight % to 20 weight %, alternatively 12 weight % to 14 weight %, based on combined weights of starting materials (A) to (F).

Starting Material (B) Polyorganosilicate Resin Component

The Si-PSA composition further comprises starting material (B), a polyorganosilicate resin component, which comprises (B-1) a capped resin and (B-2) an uncapped resin. Polyorganosilicate resins, which comprises monofunctional units ("M" units) of formula $R^M{}_3SiO_{1/2}$ and tetrafunctional silicate units ("Q" units) of formula $SiO_{4/2}$, where $R^M$ is as described above. Alternatively, at least one-third, alternatively at least two thirds of the $R^M$ groups are alkyl groups (e.g., methyl groups). Alternatively, the M units may be exemplified by $(Me_3SiO_{1/2})$ and $(Me_2PhSiO_{1/2})$. The polyorganosilicate resin is soluble in solvents such as those described above, exemplified by liquid hydrocarbons, such as benzene, toluene, xylene, and heptane, or in liquid organosilicon compounds such as low viscosity linear and cyclic polydiorganosiloxanes.

When prepared, the polyorganosilicate resin comprises the M and Q units described above, and the polyorganosiloxane further comprises units with silicon bonded hydroxyl groups and may comprise neopentamer of formula $Si(O-SiR^M{}_3)_4$, where $R^M$ is as described above, e.g., the neopentamer may be tetrakis(trimethylsiloxy)silane. $^{29}Si$ NMR spectroscopy may be used to measure hydroxyl content and molar ratio of M and Q units, where said ratio is expressed as {M(resin)}/{Q(resin)}, excluding M and Q units from the neopentamer. M:Q ratio represents the molar ratio of the total number of triorganosiloxy groups (M units) of the resinous portion of the polyorganosilicate resin to the total number of silicate groups (Q units) in the resinous portion. M:Q ratio may be 0.5:1 to 1.5:1.

The Mn of the polyorganosilicate resin depends on various factors including the types of hydrocarbon groups represented by $R^M$ that are present. The Mn of the polyorganosilicate resin refers to the number average molecular weight measured using GPC, when the peak representing the neopentamer is excluded from the measurement. The Mn of the polyorganosilicate resin is 500 g/mol to 5,000 g/mol, alternatively 2,500 g/mol to 5,000 g/mol, alternatively 2,700 g/mol to 4,900 g/mol, and alternatively 2,900 g/mol to 4,700 g/mol. A suitable GPC test method for measuring Mn is disclosed in U.S. Pat. No. 9,593,209, Reference Example 1 at col. 31.

U.S. Pat. No. 8,580,073 at col. 3, line 5 to col. 4, line 31, and U.S. Patent Publication 2016/0376482 at paragraphs [0023] to [0026] are hereby incorporated by reference for disclosing MQ resins, which are suitable polyorganosilicate resins for use in the pressure sensitive adhesive composition described herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and 0-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M{}_3SiX^1$, where $R^M$ is as described above and $X^1$ represents a hydrolyzable substituent such as halogen, alkoxy, acyloxy, hydroxyl, oximo, or ketoximo; alternatively, halogen, alkoxy or hydroxyl. Silanes with four hydrolyzable substituents may have formula $SiX^2{}_4$, where each $X^2$ is halogen, alkoxy or hydroxyl. Suitable alkali metal silicates include sodium silicate.

The polyorganosilicate resin prepared as described above is an uncapped resin, which typically contains silicon bonded hydroxyl groups, e.g., of formulae, $HOSi_{3/2}$ and/or $HOR^M{}_2SiO_{1/2}$. The polyorganosilicate resin may comprise >3% to 10% of silicon bonded hydroxyl groups, as measured by NMR spectroscopy. For certain applications, it may be desirable for the amount of silicon bonded hydroxyl groups to be 2%, alternatively <0.7%, alternatively below 0.3%, alternatively less than 1%, and alternatively 0.3% to 2%. Silicon bonded hydroxyl groups formed during preparation of the polyorganosilicate resin can be converted to trihydrocarbon siloxane groups or to a different hydrolyzable group by reacting the silicone resin with a silane, disiloxane, or disilazane containing the appropriate terminal group in a process referred to a capping. Silanes containing hydrolyzable groups may be added in molar excess of the quantity required to react with the silicon bonded hydroxyl groups on the polyorganosilicate resin.

When the polyorganosilicate resin is a capped resin, the capped may comprise 2% or less, alternatively 0.7% or less, and alternatively 0.3% or less, and alternatively 0.3% to 0.8% of units represented by formula $HOSiO_{3/2}$ and/or $HOR^M{}_2SiO_{1/2}$ where $R^M$ is as described above. The concentration of silanol groups present in the polyorganosiloxane may be determined using NMR spectroscopy as described above.

Therefore, the polyorganosilicate resin component comprises (B-1) a capped resin as described above and (B-2) an uncapped resin as described above. The capped resin may have unit formula: $(R^M{}_3Si^O{}_{1/2})_z(SiO_{4/2})_oZ_p$, where $R^M$ is as described above and subscripts z and o have values such that o>1, and subscript z>4, a quantity (o+z) has a value sufficient to give the capped resin the Mn described above (e.g., 500 g/mol to 5,000 g/mol, alternatively 1,000 g/mol to 4,700 g/mol, alternatively 2,900 g/mol to 4,700 g/mol, and alternatively 2,500 g/mol to 5,000 g/mol)), and subscript p has a value sufficient to give the capped resin a hydrolyzable group content as described above (e.g., 0 to 2%, alternatively 0 to 0.7%, and alternatively 0 to 0.3%). Starting material (B-2), the uncapped resin, may have unit formula $(R^M{}_3SiO_{1/2})_{z'}(SiO_{4/2})_{o'}Z_{p'}{}'$, where $R^M$ is as described above and subscripts z' and o' have values such that o'>1, and subscript z'>4, a quantity (o'+z') has a value sufficient to give the capped resin the Mn described above (e.g., 500 g/mol to 5,000 g/mol, alternatively 1,000 g/mol to 4,700 g/mol, alternatively 2,700 g/mol to 4,700 g/mol, and alternatively 2,500 g/mol to 5,000 g/mol)), and subscript p' has a value sufficient to give the capped resin a hydrolyzable group content as described above (e.g., >3% to 10%).

The Si-PSA composition comprises starting material (B) in an amount of 50 weight % to 70 weight %, alternatively 61 weight % to 68 weight % based on combined weights of starting materials (A) to (F) (e.g., based on combined weights of all starting materials in the Si-PSA composition, excluding solvent). The amounts of capped resin and uncapped resin in starting material (B) may be sufficient to provide a weight ratio of uncapped resin: capped resin (i.e., (B-2:)(B1)) ratio of 0.3:1 to 6:1, alternatively 0.6:1 to 6:1, and alternatively 0.3:1 to 0.7:1.

Starting Material (C) Hydrosilylation Reaction Catalyst

Starting material (C) in the Si-PSA composition is a hydrosilylation reaction catalyst. Hydrosilylation reaction catalysts are known in the art and are commercially available. Hydrosilylation reaction catalysts include platinum group metal catalysts. Such hydrosilylation reaction catalysts can be (C-1) a metal selected from platinum, rhodium, ruthenium, palladium, osmium, and iridium; alternatively platinum, ruthenium and iridium; and alternatively the metal may be platinum. Alternatively, the hydrosilylation reaction catalyst may be (C-2) a compound of such a metal, for example, chloridotris(triphenylphosphane)rhodium(I) (Wilkinson's Catalyst), a rhodium diphosphine chelate such as [1,2-bis(diphenylphosphino)ethane]dichlorodirhodium or [1,2-bis(diethylphospino)ethane]dichlorodirhodium, chloroplatinic acid (Speier's Catalyst), chloroplatinic acid hexahydrate, or platinum dichloride. Alternatively, the hydrosilylation reaction catalyst may be (C-3) a complex of the platinum group metal compound with a low molecular weight organopolysiloxane, or (C-4) the platinum group metal compound microencapsulated in a matrix or coreshell type structure. Complexes of platinum with low molecular weight organopolysiloxanes include 1,3-diethenyl-1,1,3,3-tetramethyldisiloxane complexes with platinum (Karstedt's Catalyst). Alternatively, the hydrosilylation catalyst may comprise (C-5) the complex microencapsulated in a resin matrix. Exemplary hydrosilylation reaction catalysts are described in U.S. Pat. Nos. 3,159,601; 3,220,972; 3,296,291; 3,419,593; 3,516,946; 3,814,730; 3,989,668; 4,784,879; 5,036,117; and 5,175,325; and EP 0 347 895 B. Microencapsulated hydrosilylation reaction catalysts and methods of preparing them are known in the art, as exemplified in U.S. Pat. Nos. 4,766,176 and 5,017,654. Hydrosilylation reaction catalysts are commercially available, for example, SYL-OFF™ 4000 Catalyst and SYL-OFF™ 2700 are available from Dow Silicones Corporation of Midland, Mich., USA.

The amount of hydrosilylation reaction catalyst used herein will depend on various factors including the selection of starting materials (D) and (A), and their respective contents of silicon bonded hydrogen atoms (SiH) and aliphatically unsaturated groups, and the content of the platinum group metal in the catalyst selected, however, the amount of hydrosilylation reaction catalyst is sufficient to catalyze hydrosilylation reaction of SiH and aliphatically unsaturated groups, alternatively the amount of catalyst is sufficient to provide 1 ppm to 6,000 ppm of the platinum group metal based on combined weights of starting materials containing silicon bonded hydrogen atoms and aliphatically unsaturated hydrocarbon groups; alternatively 1 ppm to 1,000 ppm, and alternatively 1 ppm to 100 ppm, on the same basis. Alternatively, when the hydrosilylation reaction catalyst comprises a platinum—organosiloxane complex, the amount of hydrosilylation reaction catalyst may be 0.01% to 5% based on combined weights of starting materials (A) to (F), (e.g., combined weights of all starting materials in the Si-PSA composition, excluding solvent).

Starting Material (D) Polyorganohydrogensiloxane

Starting material (D) in the Si-PSA composition is a polyorganohydrogensiloxane of unit formula (D-1): $(R^M{}_3SiO_{1/2})_2(R^M{}_2SiO_{2/2})_e(HR^M{}_2SiO_{2/2})_f$, where $R^M$ is as described above, subscript e≥0, subscript f≥3 and a quantity (e+f) is 4 to 500. Alternatively, the quantity (e+f) is sufficient to provide the polyorganohydrogensiloxane with an SiH content of 0.38 weight % to 2.0 weight %, alternatively 0.5% to 2%, alternatively 0.75% to 1.75%, and alternatively 0.76% to 1.6%, based on weight of the polyorganohydrogensiloxane.

Methods of preparing polyorganohydrogensiloxanes, such as hydrolysis and condensation of organohydridohalosilanes, are well known in the art. Suitable polyorganohydrogensiloxanes are exemplified by:
 i) trimethylsiloxy-terminated poly(dimethyl/methylhydrogen)siloxane,
 ii) trimethylsiloxy-terminated polymethylhydrogensiloxane,
 iii) a combination of both i) and ii).

Starting materials (A) and (D) are present in amounts sufficient to provide a molar ratio of silicon bonded hydrogen atoms/silicon bonded aliphatically unsaturated groups of 3 to 50 (referred to as the SiH/Vi ratio) in the Si-PSA composition. Alternatively, the Si-PSA composition may comprise the polyorganohydrogensiloxane at 0.1% to 5% of starting material (D), based on combined weights of starting materials (A) to (F) (e.g., combined weights of all starting materials in the Si-PSA composition, excluding solvent). Alternatively, starting materials (A) and (D) may be present in amounts sufficient to provide the Si-PSA composition with an SiH/Vi ratio of 4 to 40, alternatively 5 to 30, alternatively 6 to 20, alternatively 7 to 15, alternatively 8 to 13, and alternatively 9 to 11.

Starting Material (E) Anchorage Additive

Starting material (E) is an anchorage additive in the Si-PSA composition. Without wishing to be bound by theory, it is thought that the anchorage additive will facilitate bonding to a substrate by a Si-PSA prepared by curing the Si-PSA composition described herein. However, the presence of the anchorage additive will not detrimentally affect the desired peel adhesion, thereby allowing the Si-PSA to be removed from an electronic device without damaging the device or leaving significant residue.

Suitable anchorage additives include silane coupling agents such as methyltrimethoxysilane, vinyltrimethoxysilane, allyltrimethoxysilane, 3-methacryloxypropyltrimethoxysilane, 3-aminopropyltrimethoxysilane, N-(2-aminoethyl)-3-aminopropyltrimethoxysilane, bis(trimethoxysilyl)propane, and bis(trimethoxysilylhexane; and mixtures or reaction mixtures of said silane coupling agents. Alternatively, the anchorage additive may be tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltriethoxysilane, 3-g lycidoxypropyltrimethoxysilane, 3-g lycidoxypropyltriethoxysilane, or 3-methacryloxypropyl trimethoxysilane.

Alternatively, the anchorage additive may be exemplified by a reaction product of a vinyl alkoxysilane and an epoxy-functional alkoxysilane; a reaction product of a vinyl acetoxysilane and epoxy-functional alkoxysilane; and a combination (e.g., physical blend and/or a reaction product) of a polyorganosiloxane having at least one aliphatically unsaturated hydrocarbon group and at least one hydrolyzable group per molecule and an epoxy-functional alkoxysilane (e.g., a combination of a hydroxy-terminated, vinyl functional polydimethylsiloxane with glycidoxypropyltrimethoxysilane). Suitable anchorage additives and methods for their preparation are disclosed, for example, in U.S. Patent Application Publication Numbers 2003/0088042, 2004/0254274, 2005/0038188, 2012/0328863 at paragraph [0091], and U.S. Patent Publication 2017/0233612 at paragraph [0041]; and EP 0 556 023.

Anchorage additives are commercially available. For example, SYL-OFF™ 297 and SYL-OFF™ 397 are available from Dow Silicones Corporation of Midland, Mich., USA. Other exemplary anchorage additives include (E-1) vinyltriacetoxysilane, (E-2) glycidoxypropyltrimethoxysilane, (E-3) a combination of (E-1) and (E-2), and (E-4) a combination of (E-3) and a polydimethylsiloxane terminated with hydroxyl groups, methoxy groups, or terminated with both a hydroxy group and a methoxy group. The combinations (E-3) and (E-4) may be physical blends and/or reaction products.

The amount of anchorage additive depends on various factors including the type of substrate to which the Si-PSA composition will be applied and whether a primer or other surface treatment will be used before application of the Si-PSA composition. However, the amount of anchorage additive may be 0.1% to 5%, alternatively 1% to 5%, alternatively 2% to 4%, alternatively 3.25% to 4%, and alternatively 3.3% to 3.5%, based on the combined weights of starting materials (A) to (F) in the Si-PSA composition (e.g., based on combined weights of all starting materials in the Si-PSA composition, excluding solvent).

(F) Hydrosilylation Reaction Inhibitor

Starting material (F) is a hydrosilylation reaction inhibitor (inhibitor) that may optionally be used for altering rate of reaction of the silicon bonded hydrogen atoms and the aliphatically unsaturated hydrocarbon groups of other starting materials in the Si-PSA composition, as compared to reaction rate of the same starting materials but with the inhibitor omitted. Inhibitors are exemplified by acetylenic alcohols such as methyl butynol, ethynyl cyclohexanol, dimethyl hexynol, and 3,5-dimethyl-1-hexyn-3-ol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and a combination thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and a combination thereof; ene-yne compounds such as 3-methyl-3-penten-1-yne, 3,5-dimethyl-3-hexen-1-yne, and a combination thereof; triazoles such as benzotriazole; phosphines; mercaptans; hydrazines; amines, such as tetramethyl ethylenediamine, 3-dimethylamino-1-propyne, n-methylpropargylamine, propargylamine, and 1-ethynylcyclohexylamine; dialkyl fumarates such as diethyl fumarate, dialkenyl fumarates such as diallyl fumarate, dialkoxyalkyl fumarates, maleates such as diallyl maleate and diethyl maleate; nitriles; ethers; carbon monoxide; alkenes such as cyclo-octadiene, divinyltetramethyldisiloxane; alcohols such as benzyl alcohol; and a combination thereof.

Alternatively, the inhibitor may be a silylated acetylenic compound. Without wishing to be bound by theory, it is thought that adding a silylated acetylenic compound reduces yellowing of the reaction product prepared from hydrosilylation reaction as compared to a reaction product from hydrosilylation of starting materials that do not include a silylated acetylenic compound or that include an organic acetylenic alcohol inhibitor, such as those described above.

The silylated acetylenic compound is exemplified by (3-methyl-1-butyn-3-oxy)trimethylsilane, ((1,1-dimethyl-2-propynyl)oxy)trimethylsilane, bis(3-methyl-1-butyn-3-oxy)dimethylsilane, bis(3-methyl-1-butyn-3-oxy)silanemethylvinylsilane, bis((1,1-dimethyl-2-propynyl)oxy)dimethylsilane, methyl(tris(1,1-dimethyl-2-propynyloxy))silane, methyl(tris(3-methyl-1-butyn-3-oxy))silane, (3-methyl-1-butyn-3-oxy)dimethylphenylsilane, (3-methyl-1-butyn-3-oxy)dimethylhexenylsilane, (3-methyl-1-butyn-3-oxy)triethylsilane, bis(3-methyl-1-butyn-3-oxy)methyltrifluoropropylsilane, (3,5-dimethyl-1-hexyn-3-oxy)trimethylsilane, (3-phenyl-1-butyn-3-oxy)diphenylmethylsilane, (3-phenyl-1-butyn-3-oxy)dimethylphenylsilane, (3-phenyl-1-butyn-3-oxy)dimethylvinylsilane, (3-phenyl-1-butyn-3-oxy)dimethylhexenylsilane, (cyclohexyl-1-ethyn-1-oxy)dimethylhexenylsilane, (cyclohexyl-1-ethyn-1-oxy)dimethylvinylsilane, (cyclohexyl-1-ethyn-1-oxy)diphenylmethylsilane, (cyclohexyl-1-ethyn-1-oxy)trimethylsilane, and combinations thereof. Alternatively, the silylated acetylenic compound is exemplified by methyl(tris(1,1-dimethyl-2-propynyloxy))silane, ((1,1-dimethyl-2-propynyl)oxy)trimethylsilane, or a combination thereof. The silylated acetylenic compound useful as the inhibitor herein may be prepared by methods known in the art, for example, U.S. Pat. No. 6,677,740 discloses silylating an acetylenic alcohol described above by reacting it with a chlorosilane in the presence of an acid receptor.

The amount of inhibitor added herein will depend on various factors including the desired reaction rate, the particular inhibitor used, and the selection and amount of starting materials (A) and (D). However, when present, the amount of inhibitor may range from >0% to 5%, alternatively >0% to 1%, alternatively 0.001% to 3%, alternatively 0.01% to 2%, alternatively 0.5% to 1%, alternatively 0.65% to 0.8%, and alternatively 0.65% to 0.70%, based on the combined weights of starting materials (A) to (F) in the Si-PSA composition (e.g., based on combined weights of all starting materials in the Si-PSA composition, excluding solvent).

(G) Solvent

The Si-PSA composition may further comprise starting material (G), a solvent. The solvent may be an organic solvent such as a hydrocarbon, a ketone, an ester acetate, an ether, and/or a cyclic siloxane having an average degree of polymerization from 3 to 10. Suitable hydrocarbons for the solvent can be (G-1) an aromatic hydrocarbon such as benzene, toluene, or xylene; (G-2) an aliphatic hydrocarbon such as hexane, heptane, octane, or iso-paraffin; or (G-3) a combination thereof. Alternatively, the solvent may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Suitable cyclic siloxanes having a degree of polymerization from 3 to 10, alternatively 3 to 6, include hexamethylcyclotrisiloxane, octamethylcyclotetrasiloxane, and/or decamethylcyclopentasiloxane. Alternatively, the solvent may be selected from the group consisting of toluene, xylene, heptane, ethyl acetate, and a combination of two or more thereof.

The amount of solvent will depend on various factors including the type of solvent selected and the amount and type of other starting materials selected for the Si-PSA composition. However, the amount of solvent may range from 0% to 90%, alternatively 0% to 60%, alternatively 20 to 60%, alternatively 45% to 65%, and alternatively 50% to 60%, based on combined weights of all starting materials in the Si-PSA composition. The solvent can be added during preparation of the Si-PSA composition, for example, to aid mixing and delivery. All or a portion of the solvent may be added with one or more of the other starting materials. For example, the polyorganosilicate resin and/or the catalyst, may be dissolved in a solvent before combination with the other starting materials in the Si-PSA composition. All or a portion of the solvent may optionally be removed after the Si-PSA composition is prepared.

Method of Making the Si-PSA Composition

The Si-PSA composition can be prepared by a method comprising combining all starting materials as described above by any convenient means such as mixing at ambient or elevated temperature. The hydrosilylation reaction inhibitor may be added before the hydrosilylation reaction catalyst, for example, when the Si-PSA composition will be prepared at elevated temperature and/or the Si-PSA composition will be prepared as a one part composition.

The method may further comprise delivering one or more starting materials in a solvent (e.g., the hydrosilylation reaction catalyst and/or the polyorganosilicate resin) may be dissolved in a solvent when combined with one or more of the other starting materials in the Si-PSA composition. One skilled in the art would understand that if it is desired that the resulting Si-PSA composition will be solventless (i.e., will contain no solvent or may contain trace amounts of residual solvent from delivery of a starting material), then solvent may be removed after mixing two or more of the starting materials, and in this embodiment, solvent is not intentionally added to the Si-PSA composition.

Alternatively, the Si-PSA composition may be prepared as a multiple part composition, for example, when the Si-PSA composition will be stored for a long period of time before use, e.g., up to 6 hours before coating the Si-PSA composition on a substrate. In the multiple part composition, the hydrosilylation reaction catalyst is stored in a separate part from any starting material having a silicon bonded hydrogen atom, for example the polyorganohydrogensiloxane, and the parts are combined shortly before use of the Si-PSA composition.

For example, a multiple part composition may be prepared by combining starting materials comprising at least some of the polydiorganosiloxane gum, the polyorganohydrogensiloxane, and optionally one or more other additional starting materials described above to form a base part, by any convenient means such as mixing. A curing agent may be prepared by combining starting materials comprising at least some of the polydiorganosiloxane gum, the hydrosilylation reaction catalyst, and optionally one or more other additional starting materials described above by any convenient means such as mixing. The starting materials may be combined at ambient or elevated temperature. The hydrosilylation reaction inhibitor may be included in one or more of the base part, the curing agent part, or a separate additional part. The anchorage additive may be added to the base part, or may be added as a separate additional part. The polyorganosilicate resin may be added to the base part, the curing agent part, or a separate additional part. Alternatively, the polyorganosilicate resin may be added to the base part. The solvent may be added to the base part. Alternatively, starting materials comprising the polyorganosilicate resin and some or all of the solvent may be added in a separate additional part. When a two part composition is used, the weight ratio of amounts of base part to curing agent part may range from 1:1 to 10:1. The Si-PSA composition will cure via hydrosilylation reaction to form a Si-PSA.

The method described above may further comprise one or more additional steps. The Si-PSA composition prepared as described above may be used to form an adhesive article, e.g., a Si-PSA (prepared by curing the Si-PSA composition described above) on a substrate. The method may, therefore, further comprise comprises applying the Si-PSA composition to a substrate.

Applying the Si-PSA composition to the substrate can be performed by any convenient means. For example, the Si-PSA composition may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the pressure sensitive adhesive composition to form the pressure sensitive adhesive on the substrate. For example, any substrate that can withstand heat treatment at a temperature equal to or greater than 120° C., alternatively 150° C. is suitable. Examples of materials suitable for such substrates including polymeric films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), thermoplastic polyurethane (TPU), polyethylene (PE), or polypropylene (PP). Alternatively, the substrate may be glass. The thickness of the substrate is not critical, however, the thickness may be 5 μm to 300 μm, alternatively 50 μm to 250 μm, alternatively 100 μm to 300 μm, alternatively 100 μm, and alternatively 50 μm. Alternatively, the substrate may be selected from the group consisting of PET, TPU, PC, and glass. Alternatively, the substrate may be a polymeric substrate, such as PET.

To improve bonding of the Si-PSA to the substrate, the method for forming the adhesive article may optionally further comprise treating the substrate before applying the Si-PSA composition. Treating the substrate may be performed by any convenient means, such as applying a primer, or subjecting the substrate to corona-discharge treatment, etching, or plasma treatment before applying the Si-PSA composition to the substrate.

An adhesive article such as a film or tape may be prepared by applying the Si-PSA composition described above onto the substrate described above. When the Si-PSA composition contains a solvent, the method may further comprise removing the all, or a portion, of the solvent before and/or during curing. Removing solvent may be performed by any convenient means, such as heating at a temperature that vaporizes the solvent without fully curing the Si-PSA composition, e.g., heating at a temperature of 70° C. to 120° C., alternatively 50° C. to 100° C., and alternatively 70° C. to 80° C. for a time sufficient to remove all or a portion of the solvent (e.g., 30 seconds to 1 hour, alternatively 1 minute to 5 minutes).

Curing the Si-PSA composition may be performed by heating at a temperature of 80° C. to 200° C., alternatively 90° C. to 180° C., alternatively 100° C. to 160° C., and alternatively 110° C. to 150° C. for a time sufficient to cure the Si-PSA composition (e.g., for 30 seconds to an hour, alternatively 1 to 5 minutes). If cure speed needs to be increased or the process oven temperatures lowered, the catalyst level can be increased. This forms a pressure sensitive adhesive on the substrate. Curing may be performed by placing the substrate in an oven. The amount of the Si-PSA composition to be applied to the substrate depends on the specific application, however, the amount may be sufficient such that after curing thickness of the pressure sensitive adhesive may be 5 μm to 100 μm, and for protective film the thickness may be 5 μm to 50 μm, alternatively 10 μm to 40 μm, and alternatively 15 μm to 40 μm.

The method described herein may optionally further comprise applying a removable release liner to the Si-PSA opposite the substrate, e.g., to protect the Si-PSA before use of the adhesive article. The release liner may be applied before, during or after curing the Si-PSA composition; alternatively after curing. The adhesive article may be a protective film for use in a display device.

Use in a Protective Film

FIG. 1 shows a partial cross section of a protective film (100) overlying a surface (106a) of an anti-fingerprint coating (106) overlying a surface (107a) of a display cover glass (107) such that the opposing surface (106b) of the anti-fingerprint coating (106) contacts the surface (107a) of the cover glass (107). The protective film (100) includes a Si-PSA (105) having a surface (105a) and an opposing surface (105b). The opposing surface (105b) of the Si-PSA (105) adheres to the surface (106a) of the AF coating with a peel adhesion of >30 W/in, as measured according to Reference Example C, below. The Si-PSA may have a thickness of 15 μm to 40 μm. The Si-PSA (105) is carried on a substrate (104) having a surface (104a) and an opposing surface (104b). The surface (105a) of the Si-PSA (105) contacts the opposing surface (104b) of the substrate (104).

The substrate (104) may be selected from the group consisting of PET, TPU, PC, and glass and may have a thickness of 50 μm to 250 μm.

The protective film (100) may further comprise an anti-fingerprint hard coating (103) having a surface (103a) and an opposing surface (103b) overlying the substrate (104) such that the opposing surface (103b) of the anti-fingerprint hard coating (103) contacts the surface (104a) of the substrate (104).

The protective film (100) may further comprise a second Si-PSA (102) having a surface (102a) and an opposing surface (102b) and a polymeric substrate (101) having a surface (101b). The second Si-PSA (102) is coated on the polymeric substrate (101) such that the surface (102a) of the second Si-PSA (102) contacts the surface (101b) of the polymeric substrate (101). The opposing surface (102b) of the second Si-PSA (102) contacts the surface (103a) of the anti-fingerprint hard coating (103). The second Si-PSA (102) may have a thickness of 10 μm, and the polymeric substrate (101) may have a thickness of 50 μm. The second substrate (101) may be PET.

The Si-PSA composition and method described above may be used in fabrication of the protective film (100). The Si-PSA composition may be applied to the opposing surface (104b) of the substrate (104) and cured to form the Si-PSA (105). Alternatively, the Si-PSA composition described herein may be applied to the surface (101b) of the polymeric substrate (101) and cured to form the second Si-PSA (102). Without wishing to be bound by theory, it is thought that the Si-PSA prepared by curing the Si-PSA composition described above may have adhesion on the surface (106a) of the anti-fingerprint coating (106) of >20 Win and adhesion on stainless steel <750 g/in, as measured by the method described below in Reference Example C.

EXAMPLES

These examples are intended to illustrate the invention to one skilled in the art and are not to be interpreted as limiting the scope of the invention set forth in the claims. The materials in Table 1 were used in these examples.

TABLE 1

| Starting Material | Description | Commercial Name or Source |
|---|---|---|
| Gum 1 | bis-dimethylvinylsiloxy-terminated polydimethylsiloxane with Mn = 702,000 g/mol by GPC | Dow Silicones Corporation |
| Polymer 1 | bis-trimethylsiloxy-terminated poly(dimethyl/methylhydrogen)siloxane with vinyl content = 0.5% and Mn = 67,000 by GPC | Dow Silicones Corporation |
| Polymer 2 | bis-vinyldimethylsiloxy-terminated poly(dimethyl/methylvinyl)siloxane with vinyl content = 0.3% and Mn = 59,000 g/mol by GPC | Dow Silicones Corporation |
| Solvent borne Resin 1 | 78% of a methyl capped polymethylsilicate resin having a silanol content <3% and Mn = 4,700, dissolved in 22% of solvent mixture (of toluene, xylene, and ethylbenzene) | Dow Silicones Corporation |
| Solvent borne Resin 2 | 70% of methyl capped polymethylsilicate resin having a silanol content <3% and Mn = 2,900 g/mol by GPC, dissolved in 30% of a solvent mixture (of toluene, xylene, and ethylbenzene) | Dow Silicones Corporation |

TABLE 1-continued

| Starting Material | Description | Commercial Name or Source |
|---|---|---|
| Solvent borne Resin 3 | 66% of a methyl capped polymethylsilicate resin having a silanol content <3% and Mn = 4,100 g/mol by GPC, dissolved in 34% of a solvent mixture (of toluene, xylene, and ethylbenzene) | Dow Silicones Corporation |
| Solvent borne Resin 4 | 64% of an uncapped polymethylsilicate resin with silanol content of 3.4% and Mn = 2,700 by GPC, dissolved in 36% of a solvent mixture (of toluene, xylene, and ethylbenzene) | Dow Silicones Corporation |
| Cross-linker 1 | trimethyl-siloxy terminated poly(dimethyl/methylhydrogen)siloxane with SiH content = 1.6% | SYL-OFF ™ SL 7028 |
| Cross-linker 2 | trimethyl-siloxy terminated poly(dimethyl/methylhydrogen)siloxane with SiH content = 0.76% | DOWSIL ™ 6-3570 |
| Anchorage Additive 1 | vinyltriacetoxysilane and glycidoxypropyltrimethoxysilane | SYL-OFF ™ 297 |
| ETCH | 1-ethynyl-1-cyclohexanol | commercially available from various sources |
| 4000 Catalyst | Karstedt's Catalyst | SYL-OFF ™ 4000 Catalyst |
| Solvent Mixture | toluene, xylene, ethyl benzene, and heptane | All commercially available from various sources |

DOWSIL™, SILASTIC™, and SYL-OFF™ products are commercially available form Dow Silicones Corporation of Midland, Mich., USA.

Reference Example A—Preparation of Si-PSA Compositions

Samples of Si-PSA compositions were prepared by combining the starting materials in the amounts (in weight parts) shown below in Tables 2 and 3. Solvent borne Resins and Gums (and/or Polymer) were first combined. Crosslinkers, anchorage additive, solvent, and catalyst were then added. All the starting materials were mixed at room temperature.

Reference Example B—Preparation of Si-PSA Tape

Each Si-PSA composition prepared as described above in Reference Example A was applied on PET film with a thickness of 40 μm to 60 μm and heated in an oven at 150° C. for 2 minutes. The Si-PSA had a thickness of 25 μm to 35 μm after heating.

The resulting tape samples were applied to substrates such that the Si-PSA contacted the substrate. The substrates were AF glass and SUS, and samples were kept at RT for 30 minutes after contacting the Si-PSA with the substrate before testing.

Reference Example C—Adhesion Testing

Each tape sample prepared as described above was tested for adhesion to the AF glass and SUS substrates by peeling each tape from the substrate and checking if there was any Si-PSA transferred onto the substrate from the PET film. An Adhesion/Release Tester AR-1500 was used. The width of each PET sheet was 1 inch. Peel speed and angle were 0.3 m/min and 180°, respectively. The unit was grams/in. Results are shown below in Table 2.

TABLE 2

Comparative Examples, Sample Preparation and Test Results

| Starting Material | Comp 1 | Comp 2 | Comp 3 | Comp 4 | Comp 5 |
|---|---|---|---|---|---|
| Solvent Borne Resin 1 | 0.35 | 14.38 | 0.35 | 0.35 | 0.28 |
| Solvent Borne Resin 2 | 42.86 | 26.61 | 26.61 | 0.00 | 21.29 |
| Solvent Borne Resin 3 | 0.00 | 0.00 | 18.22 | 0.00 | 0.00 |
| Solvent Borne Resin 4 | 0.00 | 0.00 | 0.00 | 49.49 | 15.23 |
| Gum 1 | 7.31 | 7.31 | 7.31 | 7.31 | 7.31 |
| Polymer 1 | 1.65 | 1.65 | 1.65 | 1.65 | 1.65 |
| Polymer 2 | 3.05 | 3.05 | 3.05 | 3.05 | 3.05 |
| Crosslinker 1 | 0.40 | 0.40 | 0.40 | 0.40 | 0.40 |
| Crosslinker 2 | 0.10 | 0.10 | 0.10 | 0.10 | 0.10 |
| Anchorage Additive 1 | 0.18 | 0.18 | 0.18 | 0.18 | 0.18 |
| ETCH | 0.08 | 0.08 | 0.08 | 0.08 | 0.08 |
| 4000 Catalyst | 0.83 | 0.83 | 0.83 | 0.83 | 0.83 |
| Solvent Mixture | 17.06 | 17.06 | 17.06 | 17.06 | 17.06 |
| (B)/(A) (Resin/Polymer) Ratio | 1.94 | 1.96 | 1.96 | 1.96 | 1.57 |
| SiH/Vi Ratio | 10.58 | 10.58 | 10.58 | 10.58 | 10.58 |
| (B-2)/(B-1) (Uncapped/Capped Resin Ratio) | 0 | 0 | 0 | 125 | 1 |
| Adhesion to AF glass g/inch | 35.0 | 11.5 | 13.0 | 13.9 | 8.5 |
| Adhesion to SUS g/inch | 800 | 550 | 520 | 910 | 141 |

TABLE 3

Working Examples, Sample Preparation and Test Results

| Starting Material | Work 1 | Work 2 | Work 3 | Work 4 | Work 5 | Work 6 | Work 7 |
|---|---|---|---|---|---|---|---|
| Solvent Borne Resin 1 | 0.35 | 0.35 | 0.35 | 0.35 | 0.32 | 0.37 | 0.39 |
| Solvent Borne Resin 2 | 26.61 | 26.61 | 6.41 | 33.27 | 23.95 | 27.94 | 29.54 |
| Solvent Borne Resin 3 | 0.00 | 0.00 | 0.00 | 0.00 | 0.00 | 0.00 | 0 |
| Solvent Borne Resin 4 | 19.04 | 19.04 | 42.16 | 11.42 | 17.14 | 19.99 | 21.13 |
| Gum 1 | 7.31 | 7.31 | 7.31 | 7.31 | 7.31 | 7.31 | 7.31 |
| Polymer 1 | 1.65 | 1.65 | 2.20 | 1.65 | 1.65 | 1.65 | 1.65 |
| Polymer 2 | 3.05 | 3.05 | 2.50 | 3.05 | 3.05 | 3.05 | 3.05 |
| Crosslinker 1 | 0.40 | 0.40 | 0.40 | 0.40 | 0.40 | 0.40 | 0.40 |
| Crosslinker 2 | 0.10 | 0.10 | 0.10 | 0.10 | 0.10 | 0.10 | 0.10 |
| Anchorage Additive 1 | 0.18 | 0.18 | 0.18 | 0.18 | 0.18 | 0.18 | 0.18 |
| ETCH | 0.08 | 0.08 | 0.08 | 0.08 | 0.08 | 0.08 | 0.08 |
| 4000 Catalyst | 0.83 | 0.83 | 0.83 | 0.83 | 0.83 | 0.83 | 0.83 |
| Solvent Mixture | 17.06 | 17.06 | 17.06 | 17.06 | 17.06 | 17.06 | 17.06 |
| (B)/(A) (Resin/Polymer) Ratio | 1.96 | 1.96 | 1.96 | 1.96 | 1.76 | 2.06 | 2.17 |
| SiH/Vi Ratio | 10.58 | 9.98 | 10.58 | 10.58 | 10.58 | 10.58 | 10.58 |
| (B-2)/(B-1) (Uncapped/Capped Resin Ratio) | 0.67 | 0.67 | 5.94 | 0.32 | 0.67 | 0.67 | 0.67 |
| Adhesion to AF glass g/inch | 32.0 | 31.0 | 32.3 | 25.0 | 23.0 | 29.3 | 23.3 |
| Adhesion to SUS g/inch | 500 | 530 | 440 | 414 | 219 | 551 | 711 | of >20 W/in on AF glass and <750 W/in on SUS. Comparative Example 5 and the Working Examples above showed that when Resin/Polymer Ratio was too low, adhesion to AF glass was too low under the conditions tested. Comparative Example 4 and the Working Examples above showed that when (Uncapped/Capped Resin Ratio) was too high, adhesion to AF glass was too low, and adhesion to SUS was too high, under the conditions tested. Comparative Examples 1 to 3 showed that when only a capped resin was used (the Si-PSA composition contained no uncapped resin), then adhesion to AF glass was too low, adhesion to SUS was too high, or both.

Without wishing to be bound by theory, it is thought that the Si-PSA compositions described herein may cure to form Si-PSAs with peel adhesion on AF glass of >20 g/in to 33 g/in, alternatively 25 g/in to 33 g/in, and alternatively 31 g/in to 33 g/in. Furthermore, without wishing to be bound by theory, it is thought that the Si-PSA compositions described herein may cure to form Si-PSAs with peel adhesion on SUS of 200 g/in to <720 g/in, alternatively 400 W/in to 600 W/in, alternatively 410 g/in to 560 W/in, alternatively 440 g/in to 530 W/in.

The selective adhesion to AF glass and SUS properties of the Si-PSA prepared from the Si-PSA composition described herein make the protective film suitable for use on 2.5D AF glass and 3D AF glass used in display devices, such as mobile telephones, mobile television receivers, wireless devices, smartphones, personal data assistants, wireless electronic mail receivers, hand-held or portable computers, netbooks, notebooks, smartbooks, tablets, global positioning system receivers/navigators, cameras, digital media players, camcorders, game consoles, and electronic reading devices.

Problems to be Solved

Conventional silicone pressure sensitive adhesives lack the combination of properties desired for protective films used on AF glass in display devices, such as high adhesion to anti-fingerprint coatings on glass and low adhesion to stainless steel.

Electronic device fabricators are seeking a new protective film for AF glass. The peel adhesion should be >20 g/in on AF glass and <750 g/in on SUS, and alternatively the adhesion should be ≥25 g/in on AF glass and ≤600 on SUS. Selective adhesion to different substrates is a challenge for the Si-PSA industry. Conventional Si-PSAs may be able to meet one, but not both, of these peel adhesion criteria.

INDUSTRIAL APPLICABILITY

The working examples above showed that Si-PSA compositions that cure to form Si-PSAs were prepared with peel adhesion measured by the method of Reference Example C

DEFINITIONS AND USAGE OF TERMS

All amounts, ratios, and percentages herein are by weight, unless otherwise indicated. The SUMMARY and ABSTRACT are hereby incorporated by reference. The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as"

means "for example, but not limited to" or "such as, but not limited to" and encompasses other similar or equivalent examples. The abbreviations used herein have the definitions in Table 4.

TABLE 4

Abbreviations

| Abbreviation | Definition |
| --- | --- |
| 2.5D glass | refers to glass that is flat in the middle, but is rounded down at the edges |
| 3D glass | refers to glass that is either curved in the middle, or has an upwards ridge at the edge, either possibly in combination with a rounded down edge (or other more complex curves) |
| AF | anti-fingerprint |
| AF glass | glass having an anti-fingerprint coating on its surface. |
| DP | degree of polymerization |
| g | grams |
| g/in | grams per inch |
| g/mol | grams per mol |
| GPC | gel permeation chromatography |
| kg | kilogram |
| m | meters |
| Me | methyl |
| min | minutes |
| mm | millimeters |
| Mn | number average molecular weight measured by GPC as disclosed in U.S. Pat. No. 9,593,209, Reference Example 1 at col. 31 |
| mPa · s | megaPascal seconds |
| NMR | Nuclear Magnetic Resonance: the 29 Si NMR technique described in U.S. Pat. No. 9,509,209, Reference Example 2 at col. 32 can be used to measure molar ratios of M to Q siloxy units in the polyorganosilicate resin. |
| PET | polyethylene terephthalate |
| Ph | phenyl |
| PSA | pressure sensitive adhesive, including but not limited to acrylic, rubber, and/or silicone pressure sensitive adhesives |
| RT | room temperature of 20° C. to 25° C. |
| Si-PSA | silicone pressure sensitive adhesive |
| SUS | stainless steel |
| μm | micrometers |
| Vi | vinyl |

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 30" may be further delineated into a lower third, i.e., 1 to 10, a middle third, i.e., 11 to 20, and an upper third, i.e., from 21 to 30, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

EMBODIMENTS OF THE INVENTION

In a first embodiment, a silicone pressure sensitive adhesive composition comprises:
(A) an aliphatically unsaturated polydiorganosiloxane component comprising
(A-1) 18 weight % to 21 weight %, based on combined weights of starting materials (A) to (F), of a polydiorganosiloxane gum of unit formula $(R^M_2R^USiO_{1/2})_2 (R^M_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the polydiorganosiloxane gum a number average molecular weight of 500,000 g/mol;
(A-2) 12 to 14 weight %, based on combined weights of starting materials (A) to (F), of a polydiorganosiloxane polymer of unit formula $(R^M_2R^USiO_{1/2})_x (R^M_3SiO_{1/2})_y(R^MR^USiO_{2/2})_z(R^M_2SiO_{2/2})_w$, where x≥0, y≥0, (x+y)=2, z>0, and w≥0, a quantity (x+z)>0, and a quantity (x+y+z+w) is sufficient to give the polydiorganosiloxane polymer a number average molecular weight of 10,000 to 300,000 g/mol,
(B) 61 weight % to 66 weight %, based on combined weights of starting materials (A) to (F), of a polyorganosilicate resin component comprising
(B-1) a capped resin of unit formula: $(R^M_3SiO_{1/2})_z (SiO_{4/2})_oZ_p$, where Z is a hydrolyzable group, subscript p is 0 to a value sufficient to give the capped resin a hydrolyzable group content up to 2 weight %, subscripts z and o have values such that z>4, o>1, and a quantity (z+o) has a value sufficient to provide the capped resin with a number average molecular weight of 500 g/mol to 5,000 g/mol;
(B-2) an uncapped resin of unit formula $(R^M_3SiO_{1/2})_{z'} (SiO_{4/2})_oZ_{p'}$, where subscript p' has a value sufficient to give the uncapped resin a hydrolyzable group content of >3 weight % to 10 weight %, subscripts z' and o' have values such that z'>4, o'>1, and a quantity (z'+o') has a value sufficient to provide the uncapped resin with a number average molecular weight of 500 g/mol to 5,000 g/mol,
where starting materials (B-1) and (B-2) are present in a weight ratio (B-2):(B-1) of 0.3:1 to 6:1; where starting materials (A) and (B) are present in a weight ratio of (B):(A) (Resin:Polymer ratio) of 1.7:1 to 2.2:1;
(C) 0.01 weight % to 5 weight %, based on combined weights of starting materials (A) to (F) of a hydrosilylation reaction catalyst;
(D) 0.1 weight % to 5 weight %, based on combined weights of starting materials (A) to (F) of a polyorganohydrogensiloxane of unit formula: $(R^M_3SiO_{1/2})_2(R^M_2SiO_{2/2})_e (HR^M_2SiO_{2/2})_f$, where subscript e≥0, subscript f≥3 and a quantity (e+f) is 4 to 500;
where starting materials (A), (B), and (D) are present in amounts such that molar ratio of silicon bonded hydrogen atoms in starting material (D) to aliphatically unsaturated groups in starting materials (A) and (B) (SiH/Vi ratio) is 9 to 11;

(E) 0.1 weight % to 5 weight %, based on combined weights of starting materials (A) to (F), of an anchorage additive;

(F) 0 weight % to 5 weight %, based on combined weights of starting materials (A) to (F) of a hydrosilylation reaction inhibitor; and (G) 0 weight % to 60 weight %, based on combined weights of all starting materials in the composition, of a solvent, with the proviso that the silicone pressure sensitive composition is free of fluorinated starting materials.

In a second embodiment in the composition of the first embodiment, starting material (A-1), the polydiorganosiloxane gum, has: each $R^M$ is an independently selected alkyl group of 1 to 10 carbon atoms; each $R^U$ is an independently selected alkenyl group of 2 to 10 carbon atoms; and subscript a has a value of sufficient to give the polydiorganosiloxane gum a number average molecular weight of 500,000 to 1,000,000 g/mol.

In a third embodiment, in the composition of the first embodiment or the second embodiment, starting material (A-2), the polydiorganosiloxane polymer, has: each $R^M$ is an independently selected alkyl group of 1 to 10 carbon atoms; each $R^U$ is an independently selected alkenyl group of 2 to 10 carbon atoms; and the quantity (x+y+z+w) is sufficient to give the polydiorganosiloxane polymer a number average molecular weight of 50,000 g/mol 75,000 g/mol.

In a fourth embodiment, in the composition of any one of the preceding embodiments, starting material (B-1), the capped resin, has: each $R^M$ is an independently selected alkyl group of 1 to 10 carbon atoms; and subscripts z and o have values such that the quantity (z+o) has a value sufficient to provide the capped resin with a number average molecular weight of 2,900 g/mol to 4,700 g/mol.

In a fifth embodiment, in the composition of any one of the preceding embodiments, starting material (B-2), the uncapped resin, has: each $R^M$ is an independently selected alkyl group of 1 to 10 carbon atoms; and subscripts z' and o' have values such that the quantity (z'+o') has a value sufficient to provide the uncapped resin with a number average molecular weight of 2,700 g/mol to 4,700 g/mol.

In a sixth embodiment, in the composition of any one of the preceding embodiments, starting material (C), the hydrosilylation reaction catalyst, comprises a platinum—organosiloxane complex.

In a seventh embodiment, in the composition of any one of the preceding embodiments, starting material (D), the polyorganohydrogensiloxane, has: each $R^M$ is an independently selected alkyl group of 1 to 10 carbon atoms; and the quantity (e+f) has a value sufficient to provide the polyorganohydrogensiloxane with an SiH content of 0.76 weight % to 1.6 weight %.

In an eighth embodiment, in the composition of any one of the preceding embodiments, each $R^M$ is methyl and each $R^U$ is selected from the group consisting of vinyl, allyl, and hexenyl.

In a ninth embodiment, in the composition of any one of the preceding embodiments, starting material (E), the anchorage additive, is selected from the group consisting of (E-1) vinyltriacetoxysilane, (E-2) glycidoxypropyltrimethoxysilane, (E-3) a combination of (E-1) and (E-2), and (E-4) a combination of (E-3) and a polydimethylsiloxane terminated with hydroxyl groups, methoxy groups, or terminated with both a hydroxy group and a methoxy group.

In a tenth embodiment, in the composition of any one of the preceding embodiments, starting material (F), the hydrosilylation reaction inhibitor, is present and is selected from the group consisting of (F-1) 1-ethynyl-1-cyclohexanol, (F-2) methyl butynol, (F-3) diallyl maleate, and (F-4) a combination of two or more of (F-1), (F-2) and (F-3).

In an eleventh embodiment, in the composition of any one of the preceding embodiments, starting material (G), the solvent, is present and is selected from the group consisting of toluene, xylene, heptane, ethyl benzene, and a combination of two or more thereof.

In a twelfth embodiment, a silicone pressure sensitive adhesive is prepared by curing the composition of any one of the preceding embodiments.

In a thirteenth embodiment, a protective film comprises:
1) the silicone pressure sensitive adhesive of the twelfth embodiment,
2) a first polymeric substrate having a first surface and an opposing second surface, where the silicone pressure sensitive adhesive is disposed on the first surface.

In a fourteenth embodiment, a method for preparing a protective film comprising a silicone pressure sensitive adhesive on a surface of a substrate comprises:
optionally 1) treating the surface of the substrate,
2) coating a silicone pressure sensitive adhesive composition on the surface of the substrate, where the silicone pressure sensitive adhesive composition comprises (A) an aliphatically unsaturated polydiorganosiloxane component comprising (A-1) 18 weight % to 21 weight %, based on combined weights of starting materials (A) to (F), of a polydiorganosiloxane gum of unit formula $(R^M_2R^USiO_{1/2})_2(R^M_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the polydiorganosiloxane gum a number average molecular weight of 500,000 g/mol;

(A-2) 12 to 14 weight %, based on combined weights of starting materials (A) to (F), of a polydiorganosiloxane polymer of unit formula $(R^M_2R^USiO_{1/2})_x(R^M_3SiO_{1/2})_y(R^MR^USiO_{2/2})_z(R^M_2SiO_{2/2})_w$, where x≥0, y≥0, (x+y)=2, z>0, and w≥0, a quantity (x+z)>0, and a quantity (x+y+z+w) is sufficient to give the polydiorganosiloxane polymer a number average molecular weight of 10,000 to 300,000 g/mol, (B) 61 weight % to 66 weight %, based on combined weights of starting materials (A) to (F), of a polyorganosilicate resin component comprising (B-1) a capped resin of unit formula: $(R^M_3SiO_{1/2})_z(SiO_{4/2})_oZ_p$, where Z is a hydrolyzable group, subscript p is 0 to a value sufficient to give the capped resin a hydrolyzable group content up to 2%, subscripts z and o have values such that z>4, o>1, and a quantity (z+o) has a value sufficient to provide the capped resin with a number average molecular weight of 500 g/mol to 5,000 g/mol;

(B-2) an uncapped resin of unit formula $(R^M_3SiO_{1/2})_{z'}(SiO_{4/2})_{o'}Z_{p'}$, where subscript p' has a value sufficient to give the uncapped resin a hydrolyzable group content of >3% to 10%, subscripts z' and o' have values such that z'>4, o'>1, and a quantity (z'+o') has a value sufficient to provide the uncapped resin with a number average molecular weight of 500 g/mol to 5,000 g/mol, where starting materials (B-1) and (B-2) are present in a weight ratio (B-2):(B-1) of 0.3:1 to 6:1;

where starting materials (A) and (B) are present in a weight ratio of (B):(A)

(Resin:Polymer ratio) of 1.7:1 to 2.2:1;

(C) 0.01 weight % to 5 weight %, based on combined weights of starting materials (A) to (F) of a hydrosilylation reaction catalyst;

(D) 0.1 weight % to 5 weight %, based on combined weights of starting materials (A) to (F) of a polyorganohydrogensiloxane of unit formula: $(R^M{}_3SiO_{1/2})_2(R^M{}_2SiO_{2/2})_e(HR^M{}_2SiO_{2/2})_f$, where subscript e≥0, subscript f≥3 and a quantity (e+f) is 4 to 500;

where starting materials (A), (B), and (D) are present in amounts such that molar ratio of silicon bonded hydrogen atoms in starting material (D) to aliphatically unsaturated groups in starting materials (A) and (B) (SiH/Vi ratio) is 3 to 50;

(E) 0.1 weight % to 5 weight %, based on combined weights of starting materials (A) to (F), of an anchorage additive;

(F) 0 weight % to 5 weight %, based on combined weights of starting materials (A) to (F) of a hydrosilylation reaction inhibitor; and (G) 0 weight % to 60 weight %, based on combined weights of all starting materials in the composition of a solvent, with the proviso that the silicone pressure sensitive composition is free of fluorinated starting materials;

optionally 3) removing some or all of the solvent, when present, and 4) curing the pressure sensitive adhesive composition.

In a fifteenth embodiment, the method of the fourteenth embodiment further comprises applying the protective film on an anti-fingerprint coating for a display glass.

What is claimed is:

1. A silicone pressure sensitive adhesive composition comprising:
   (A) an aliphatically unsaturated polydiorganosiloxane component comprising
     (A-1) 15 weight % to 30 weight %, based on combined weights of starting materials (A) to (F), of a polydiorganosiloxane gum of unit formula $(R^M{}_2R^USiO_{1/2})_2(R^M{}_2SiO_{2/2})_a$, where each $R^M$ is an independently selected monovalent hydrocarbon group of 1 to 30 carbon atoms that is free of aliphatic unsaturation; each $R^U$ is an independently selected monovalent aliphatically unsaturated hydrocarbon group of 2 to 30 carbon atoms; and subscript a has a value sufficient to give the polydiorganosiloxane gum a number average molecular weight of ≥500,000 g/mol;
     (A-2) 5 to 20 weight %, based on combined weights of starting materials (A) to (F), of a polydiorganosiloxane polymer of unit formula $(R^M{}_2R^USiO_{1/2})_x(R^M{}_3SiO_{1/2})_y(R^MR^USiO_{2/2})_z(R^M{}_2SiO_{2/2})_w$, where x≥0, y≥0, (x+y)=2, z>0, and w≥0, a quantity (x+z)>0, and a quantity (x+y+z+w) is sufficient to give the polydiorganosiloxane polymer a number average molecular weight of 10,000 to 300,000 g/mol,
   (B) 50 weight % to 70 weight %, based on combined weights of starting materials (A) to (F), of a polyorganosilicate resin component comprising (B-1) a capped resin of unit formula: $(R^M{}_3SiO_{1/2})_z(SiO_{4/2})_oZ_p$, where Z is a hydrolyzable group, subscript p is 0 to a value sufficient to give the capped resin a hydrolyzable group content up to 2 mole %, subscripts z and o have values such that z>4, o>1, and a quantity (z+o) has a value sufficient to provide the capped resin with a number average molecular weight of 500 g/mol to 5,000 g/mol;

(B-2) an uncapped resin of unit formula $(R^M{}_3SiO_{1/2})_{z'}(SiO_{4/2})_{o'}Z_{p'}$, where subscript p' has a value sufficient to give the uncapped resin a hydrolyzable group content of >3 mole % to 10 mole %, subscripts z' and o' have values such that z'>4, o'>1, and a quantity (z'+o') has a value sufficient to provide the uncapped resin with a number average molecular weight of 500 g/mol to 5,000 g/mol, where starting materials (B-1) and (B-2) are present in a weight ratio (B-2):(B-1) of 0.3:1 to 6:1;

where starting materials (A) and (B) are present in a weight ratio of (B):(A) (Resin:Polymer ratio)>1.6:1;

(C) 0.01 weight % to 5 weight %, based on combined weights of starting materials (A) to (F) of a hydrosilylation reaction catalyst;

(D) 0.1 weight % to 5 weight %, based on combined weights of starting materials (A) to (F) of a polyorganohydrogensiloxane of unit formula: $(R^M{}_3SiO_{1/2})_2(R^M{}_2SiO_{2/2})_e(HR^M{}_2SiO_{2/2})_f$, where subscript e 0, subscript f≥3 and a quantity (e+f) is 4 to 500;

where starting materials (A), (B), and (D) are present in amounts such that molar ratio of silicon bonded hydrogen atoms in starting material (D) to aliphatically unsaturated groups in starting materials (A) and (B) (SiH/Vi ratio) is 3 to 50;

(E) 0.1 weight % to 5 weight %, based on combined weights of starting materials (A) to (F), of an anchorage additive;

(F) 0 weight % to 5 weight %, based on combined weights of starting materials (A) to (F) of a hydrosilylation reaction inhibitor; and (G) 0 weight % to 60 weight %, based on combined weights of all starting materials in the composition of a solvent, with the proviso that the silicone pressure sensitive composition is free of fluorinated starting materials.

2. The composition of claim 1, where in starting material (A-1), the polydiorganosiloxane gum, each $R^M$ is an independently selected alkyl group of 1 to 10 carbon atoms; each $R^U$ is an independently selected alkenyl group of 2 to 10 carbon atoms; and subscript a has a value of sufficient to give the polydiorganosiloxane gum a number average molecular weight of 500,000 to 1,000,000 g/mol.

3. The composition of claim 1, where in starting material (A-2), the polydiorganosiloxane polymer, each $R^M$ is an independently selected alkyl group of 1 to 10 carbon atoms; each $R^U$ is an independently selected alkenyl group of 2 to 10 carbon atoms; and the quantity (x+y+z+w) is sufficient to give the polydiorganosiloxane polymer a number average molecular weight of 50,000 g/mol 150,000 g/mol.

4. The composition of claim 1, where in starting material (B-1), the capped resin, each $R^M$ is an independently selected alkyl group of 1 to 10 carbon atoms; and subscripts z and o have values such that the quantity (z+o) has a value sufficient to provide the capped resin with a number average molecular weight of 1,000 g/mol to 4,700 g/mol.

5. The composition of claim 1, where in starting material (B-2), the uncapped resin, each $R^M$ is an independently selected alkyl group of 1 to 10 carbon atoms; and subscripts z' and o' have values such that the quantity (z'+o') has a value sufficient to provide the uncapped resin with a number average molecular weight of 1,000 g/mol to 4,700 g/mol.

6. The composition of claim 1, where starting material (C), the hydrosilylation reaction catalyst, comprises a platinum—organosiloxane complex.

7. The composition of claim 1, where in starting material (D), the polyorganohydrogensiloxane, each $R^M$ is an independently selected alkyl group of 1 to 10 carbon atoms; and the quantity (e+f) has a value sufficient to provide the polyorganohydrogensiloxane with an SiH content of 0.38 weight % to 2.00 weight %.

8. The composition of claim 1, where each $R^M$ is methyl and each $R^U$ is selected from the group consisting of vinyl, allyl, and hexenyl.

9. The composition of claim 1, where starting material (E), the anchorage additive, is selected from the group consisting of (E-1) vinyltriacetoxysilane, (E-2) glycidoxypropyltrimethoxysilane, (E-3) a combination of (E-1) and (E-2), and (E-4) a combination of (E-3) and a polydimethylsiloxane terminated with hydroxyl groups, methoxy groups, or terminated with both a hydroxy group and a methoxy group.

10. The composition of claim 1, where starting material (F), the hydrosilylation reaction inhibitor, is present and is selected from the group consisting of (F-1) 1-ethynyl-1-cyclohexanol, (F-2) methyl butynol, (F-3) diallyl maleate, and (F-4) a combination of two or more of (F-1), (F-2) and (F-3).

11. The composition of claim 1, where (G) the solvent is present and is selected from the group consisting of toluene, xylene, heptane, ethyl benzene, and a combination of two or more thereof.

12. A silicone pressure sensitive adhesive prepared by curing the composition of claim 1.

13. A protective film comprising:
  1) the silicone pressure sensitive adhesive of claim 12,
  2) a first polymeric substrate having a first surface and an opposing second surface, where the silicone pressure sensitive adhesive is disposed on the first surface.

14. A method for preparing protective film comprising:
  optionally 1) treating a surface of a substrate,
  2) coating the silicone pressure sensitive adhesive composition of claim 1 on the surface of the substrate,
  optionally 3) removing some or all of the solvent, when present, and
  4) curing the pressure sensitive adhesive composition.

15. The method of claim 14, further comprising applying the protective film on an anti-fingerprint coating for a display glass.

* * * * *